June 5, 1923.
E. FAVARY
RESILIENT TIRE
Filed Nov. 16, 1920
1,457,512
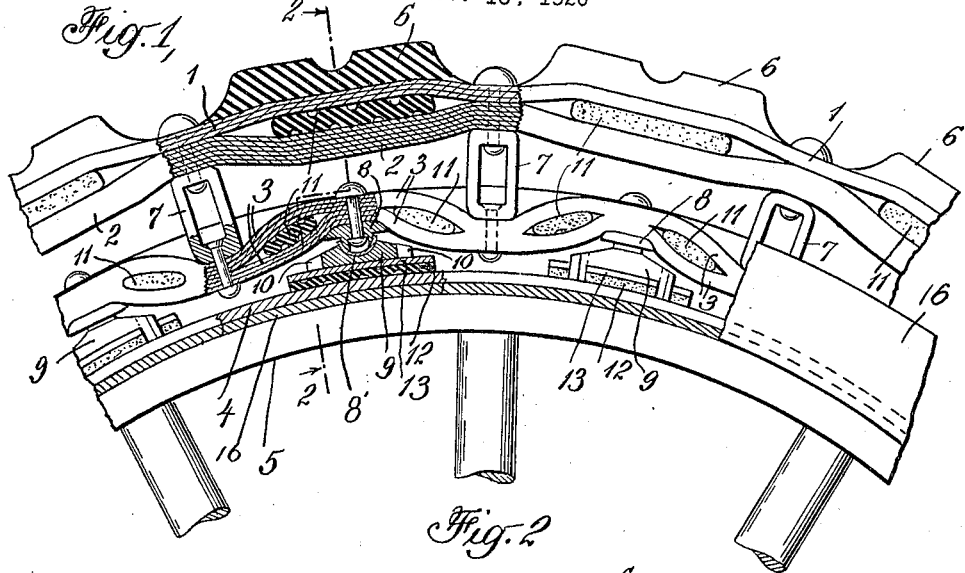
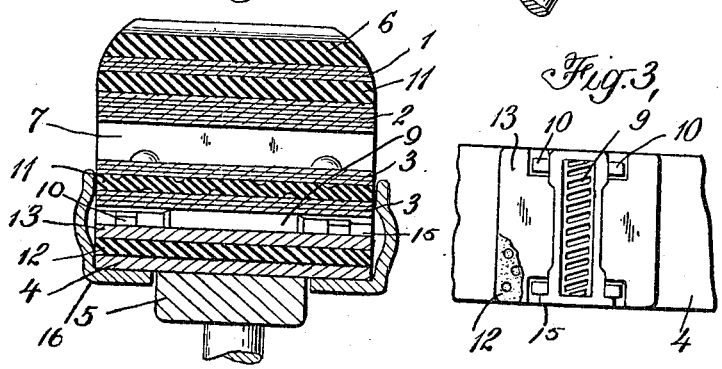
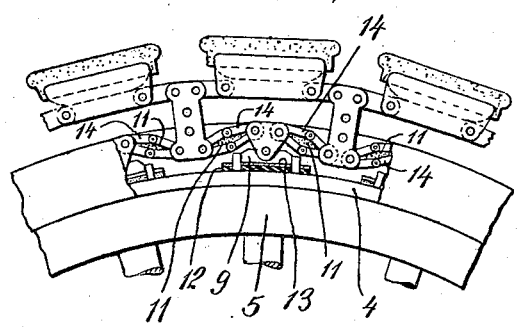
Inventor
Ethelbert Favary
By his Attorneys
Pennie, Davis, Marvin & Edmonds Patented June 5, 1923.

1,457,512

UNITED STATES PATENT OFFICE.

ETHELBERT FAVARY, OF NEW YORK, N. Y.

RESILIENT TIRE.

Application filed November 16, 1920. Serial No. 424,407.

*To all whom it may concern:*

Be it known that I, ETHELBERT FAVARY, a citizen of the United States of America, residing at borough of Manhattan, city of New York, in the county of New York, State of New York, have invented certain new and useful Improvements in Resilient Tires; and I do hereby declare the following to be a full, clear, and exact description of the invention, such as will enable others skilled in the art to which it appertains to make and use the same.

This invention relates to resilient tires of the type disclosed and claimed in Patents Nos. 981,253, January 10, 1911 and 1,136,326, April 20, 1915, and 1,363,856 and 1,363,857, December 28, 1920.

The resiliency of such tires is due not to the elasticity of any of their parts but to the flexing of a plurality of circumferential tensioned bands or chains spaced apart by a staggered series of rigid supporting blocks or links. These bands are normally under high tension even when the tire is supporting no load and the system is in its normal state of equilibrium. When the tire is subjected to deforming pressure at one point as in ordinary use, a new force is added, the tension in the bands is still further increased, and the whole system rearranges itself. The moment this external force is removed the great tension in the bands will immediately cause the system to return to its former position. This response to external pressure variations and the return to its normal position when the load is removed is practically immediate, and is comparable to that of a perfectly elastic medium such as a gas. It is much quicker than that of rubber which is of low elastic efficiency. Consequently such tires are adaptable for very high speeds. The secret of success lies in the substantial absence of imperfect elastic media and the reliance upon the action of forces in a flexible and practically non-elastic system.

Nevertheless, it has been discovered that a very small amount of extra give in the structure, i. e., in the bands beyond what the material itself contains, or beneath the lowest supporting blocks lends added resiliency to the tire and has beneficial results. A very small degree of elasticity in the parts adds to the resiliency of the tire, but this added elasticity must not be so large as to cause a decrease in the tension of the bands when an external load is applied and when the tire is running at a comparatively high rate of speed. This effect can be produced by the insertion of a bit of elastic material between the plies of the bands at points between their supports and also by resiliently supporting the bands, this preferably by placing a thin layer of elastic material between the lowest supporting blocks and the rim. It is therefore an object of this invention to increase the resiliency of tires made of substantially non-elastic material by these means. This small amount of give relieves somewhat the increase in tension in the bands under rapid external load and consequently makes possible the use of bands of less tensile strengths. This is therefore a further object of the invention.

In order that the invention may be more clearly understood reference is had to the accompanying drawings, disclosing preferred embodiments thereof and in which—

Figure 1 is a view partly in section of a tire embodying the invention; Figure 2 is a section taken on line 2—2 of Fig. 1; Figure 3 is a plan view of one of the sockets, the support therefor being partly broken away to show the resilient element; and Figure 4 is a view of a tire of modified form.

The tire shown in Figure 1 comprises circumferential bands 2 and 3 mounted upon the solid rim 4 of a wheel 5. These bands are built up of a series of plies of substantially non-elastic, non-stretchable, but pliable fabric material such as rubberized reinforced canvas, but preferably of a special substantially non-stretchable weave, or of chain links. The outer layers of fabric 1 are part of the tread 6. The band 2 upon which the tread band is positioned is highly tensioned and supported upon a series of hollow supporting blocks 7 to which it is securely riveted to prevent circumferential and lateral movement or displacement. These supporting blocks 7 are in turn similarly supported upon the innermost band 3 and this band 3 is itself supported by a series of rocking members 8 having steel caps 8' to which it is securely riveted and which alternate with the supporting blocks 7. These rocking members 8 are seated in a series of sockets 9 held in place upon the rim 4 by means of abutments 10 projecting therefrom and cooperating with flanges 15 at one end of each socket. The inner surface of each socket contains blocks of graphite 9' baked in grooves therein to decrease friction. The tension band 2 holds the otherwise flabby structure in position. The wheel is provided with side plates 16, which enclose and protect the inner part of the tire. The general structure of this tire is the same as that disclosed in Patent 1,363,857.

The operation of this tire may be briefly reviewed as follows: The band 2 being highly tensioned bears inwardly at all times upon the band 3 through blocks 7, and this band 3 being somewhat longer than the circumference of a circle drawn through its points of support is depressed as shown. When an external radially acting force is exerted upon the tire, as for example on the tread, at 6, added pressure is exerted upon blocks 7, the corresponding depressions in band 3 are deepened, and the rocking members 8 rock slightly towards the points of the highest external pressure. This results in raising the other depressions in the band around a portion of the circumference, which means that some of the blocks 7 are urged further outward against the tension of band 2. Both plate 13 and rubber sheet 12 are cut away, as shown in Fig. 3, to make room for abutments 10 and flanges 15 of the socket members. As soon therefore as the external pressure is relieved, the system tends to revert to its former state of equilibrium and the depressions in band 3 assume their former positions. During this operation the tension on the bands 2 and 3 and the pressure on blocks 7, rocking members 8 and sockets 9 is increased.

According to the present invention, the slight added resilience is obtained by allowing a slight give in these various members. To accomplish this a small amount of some elastic material is placed between the tread band and band 2, or between the plies of the bands or beneath sockets 9, or in any of these places in combination. As shown most clearly in Figures 1 and 2, this elastic material consists of pieces of compressible and preferably corrugated rubber 11 inserted between the plies of the bands, between the tread band and band 2, and a thin sheet of similar material 12 placed between the rim 4 and sockets 9. When the tension on the bands is increased there is a slight transverse component of this force tending to press the several plies closely together. The interposition of a small amount of yielding material between these plies enables this force actually to decrease the thickness of the band where the rubber is placed and slightly increase their length, thus relieving the extra tension somewhat from what it would be without this yielding material and producing the necessary deformation in the tire. It must be remembered that this transverse component is relatively very small and that the actual compression of the rubber very slight. In order to increase the effectiveness of the rubber positioned beneath sockets 9, the area of this rubber might be increased beyond that of the socket itself and in order to distribute the load over this increased area, it might be found desirable to interpose a plate of metal 13 of an area practically equal to that of the rubber between the socket 9 and the rubber 12.

The tire shown in Figure 4 is an articulated link structure embodying this invention. Here the links may be made double shown as at 14 and the yielding material 11 inserted between the parts. But since tires of this type are intended for heavier loads running at lower speeds this may not be necessary. Sufficient added resiliency may be obtained by the use of a thin sheet of rubber 12 placed between rim 4 and sockets 9.

Although the elastic material has been shown located between the plies of the circumferential bands and between the solid rim and the band supports and it has been shown as used in these places concurrently, it is, of course, clear that it might be used in one place only and that only one of the bands might be modified or that it might be used under blocks 9 only. Rubber has also been instanced as the preferred elastic material. This also is not essential and any other elastic medium might be employed, such for example as metallic springs or the like, but in each case the give must be limited to a small amount so that an external load causes an increase in the tension of the bands. The invention has also been shown in connection with two kinds of non-elastic resilient tires, but its use is not necessarily limited to these. It is applicable wherever similar problems arise.

I claim:

1. In a resilient tire, a plurality of circumferential pliable bands, rigid supports interposed between said bands and fastened thereto, the supports maintaining the bands under tension in a longitudinal direction, and means permitting a slight give in the bands for the purpose described.

2. In a resilient tire, a plurality of circumferential pliable bands, rigid supports interposed between said bands and fastened thereto, and elastic material inserted within one of the bands permitting a slight give thereof for the purpose described.

3. In a resilient tire, a plurality of circumferential tensioned fabric bands, rigid supports interposed between said bands and fastened thereto, a tread band positioned upon the outermost tensioned band, and elastic material inserted between the tread band and the outermost tensioned band to permit a slight longitudinal give therein for the purpose described.

4. In combination with a wheel, a resilient tire embodying a plurality of circumferential bands, a plurality of rigid supports interposed in spaced relation to each other between the several bands and between the innermost band and the wheel, maintaining the bands under tension in a longitudinal direction, and elastic material permitting a slight give in the inner supports for the purpose described.

5. In combination with a wheel, a resilient tire embodying a plurality of circumferential bands, a plurality of rigid supports interposed in spaced relation to each other between the several bands and between the innermost band and the wheel and maintaining the bands under tension in a longitudinal direction, and an elastic material situated between the innermost supports and the wheel to lend slight added resiliency to the whole for the purpose described.

6. In combination with a wheel, a resilient tire embodying a plurality of circumferential bands, a plurality of rigid supports interposed in spaced relation to each other between the several bands and between the innermost band and the wheel and maintaining the bands under tension in a longitudinal direction, and thin sheets of rubber situated between the innermost supports and the wheel to lend slight added resiliency to the whole.

7. A resilient deformable tire comprising a rigid rim supporting a deformable and in itself flabby structure of practically non-elastic and non-springy tension and compression members, the tension member being fastened to the compression members, a tension band holding said structure in tension to render it resilient and elastic means permitting a slight give in the tension and compression means and in the tension band for the purpose described.

8. A resilient deformable tire comprising a rigid rim supporting a deformable and in itself flabby mechanical structure of practically non-elastic and non-springy positively connected component parts, a tension band holding said structure in tension to render it resilient and means permitting a slight give in the parts for the purpose described.

9. In a resilient tire, a plurality of circumferential pliable bands, rigid supports interposed between said bands and fastened thereto, the supports maintaining the bands under tension in a longitudinal direction, and means permitting a slight give in the bands and a consequent rocking of the supports for the purpose described.

In testimony whereof I affix my signature.

ETHELBERT FAVARY.

Certificate of Correction.

It is hereby certified that in Letters Patent No. 1,457,512, granted June 5, 1923, upon the application of Ethelbert Favary, of New York, N. Y., for an improvement in "Resilient Tires," errors appear in the printed specification requiring correction as follows: Page 2, line 29, beginning with the word "Both" strike out all to and including the word "members", line 32; same page, after line 77 insert *Both plate 13 and rubber sheet 12 are cut away, as shown in Figure 3, to make room for abutments 10 and flanges 15 of the socket members.;* and that the said Letters Patent should be read with these corrections therein that the same may conform to the record of the case in the Patent Office.

Signed and sealed this 14th day of August, A. D., 1923.

[SEAL.]
KARL FENNING,
*Acting Commissioner of Patents.*